(12) United States Patent
Gross

(10) Patent No.: US 7,808,480 B2
(45) Date of Patent: Oct. 5, 2010

(54) METHOD AND SYSTEM FOR SECURE INPUT

(75) Inventor: Rene Gross, Schwarzach (DE)

(73) Assignee: SAP AG, Walldorf (DE)

( * ) Notice: Subject to any disclaimer, the term of this patent is extended or adjusted under 35 U.S.C. 154(b) by 876 days.

(21) Appl. No.: 11/261,882

(22) Filed: Oct. 28, 2005

(65) Prior Publication Data

US 2007/0097076 A1    May 3, 2007

(51) Int. Cl.
*G09G 5/08* (2006.01)
(52) U.S. Cl. ............... 345/163; 345/156; 345/167; 713/182; 713/184; 713/185
(58) Field of Classification Search ........... 345/156, 345/163, 327; 713/184, 185, 202, 182
See application file for complete search history.

(56) References Cited

U.S. PATENT DOCUMENTS

| | | | |
|---|---|---|---|
| 5,596,656 A | | 1/1997 | Goldberg |
| 5,764,794 A | | 6/1998 | Perlin |
| 5,790,115 A | * | 8/1998 | Pleyer et al. ............... 715/716 |
| 6,044,174 A | | 3/2000 | Sinden |
| 6,057,845 A | | 5/2000 | Dupouy |
| 6,208,757 B1 | | 3/2001 | Sinden |
| 6,215,901 B1 | | 4/2001 | Schwartz |
| 6,366,697 B1 | | 4/2002 | Goldberg et al. |
| 6,493,464 B1 | | 12/2002 | Hawkins et al. |
| 6,498,601 B1 | | 12/2002 | Gujar et al. |
| 6,580,826 B1 | | 6/2003 | Sinden |
| 6,654,496 B1 | | 11/2003 | Goldberg |
| 6,658,574 B1 | * | 12/2003 | Anvekar ............... 726/16 |
| 6,670,951 B2 | | 12/2003 | Clough et al. |
| 6,704,006 B2 | | 3/2004 | Cherry et al. |
| 6,792,146 B2 | | 9/2004 | Kenagy |
| 6,816,859 B2 | | 11/2004 | Goldberg et al. |
| 6,839,464 B2 | | 1/2005 | Hawkins et al. |
| 7,004,394 B2 | | 2/2006 | Kim |
| 7,120,474 B1 | * | 10/2006 | Sharp ............... 455/575.1 |
| 7,250,938 B2 | | 7/2007 | Kirkland et al. |
| 2002/0080044 A1 | * | 6/2002 | Kang et al. ............ 340/825.69 |
| 2002/0188872 A1 | * | 12/2002 | Willeby ............... 713/202 |
| 2002/0196274 A1 | * | 12/2002 | Comfort et al. ............ 345/741 |
| 2005/0035945 A1 | * | 2/2005 | Keenan et al. ............ 345/163 |
| 2005/0193208 A1 | * | 9/2005 | Charrette et al. ............ 713/182 |

FOREIGN PATENT DOCUMENTS

WO    WO 01/28191 A1 *    4/2001

OTHER PUBLICATIONS

Using the Graffiti 2 writing system, Article ID: 8366, Jul. 22, 2004.

* cited by examiner

*Primary Examiner*—Amare Mengistu
*Assistant Examiner*—Premal Patel
(74) *Attorney, Agent, or Firm*—Kenyon & Kenyon LLP

(57) ABSTRACT

A method and system for inputting a character string using a handheld input device, such as a mouse wheel or touchpad. Signals are grouped depending on a change in direction, depressing the mouse button as an interrupt, holding a mouse button down, etc., and the groupings are translated into symbols. Translation can be pre-determined or from a mapping file. Symbols can be appended into a character string and provided as a password, PIN, credit card, account number, or as other sensitive data.

14 Claims, 12 Drawing Sheets

302

303

304

305

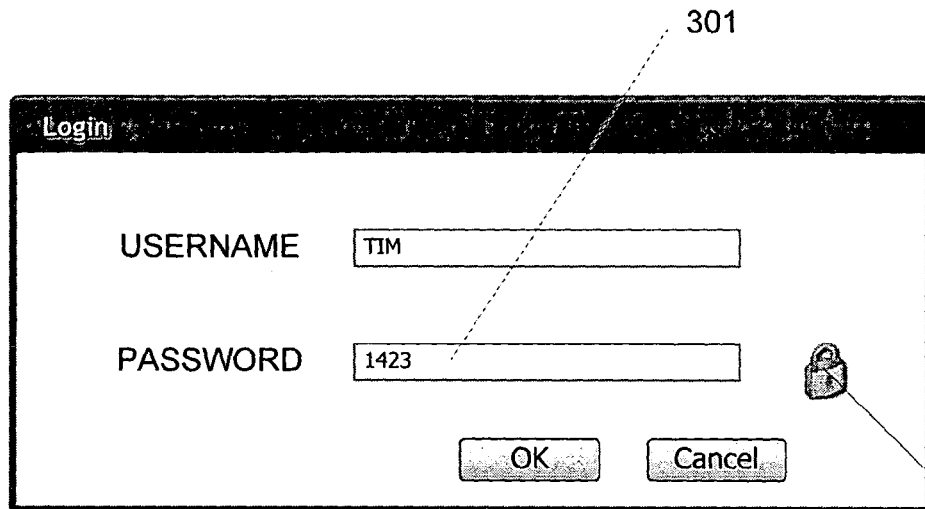
FIG. 3a
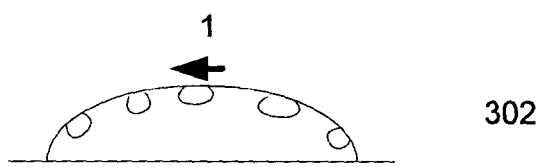
302
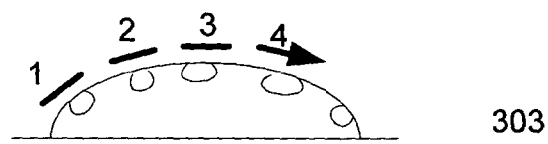
303
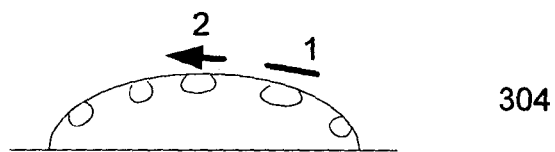
304
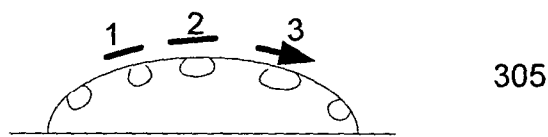
305
FIG. 3b

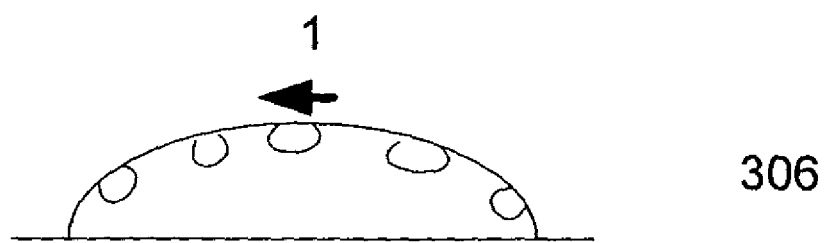
306
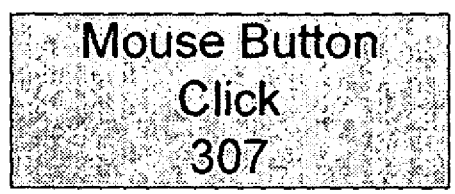
307
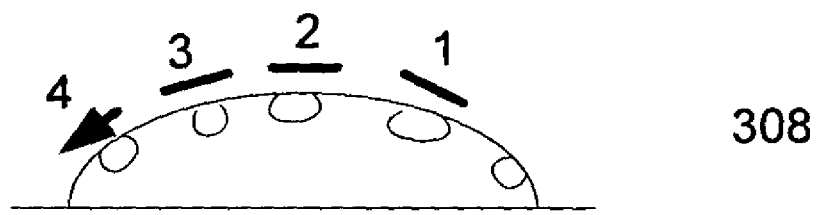
308
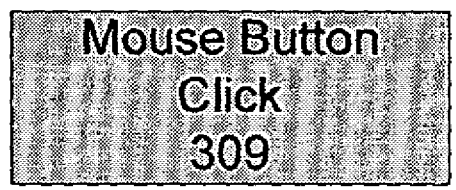
309
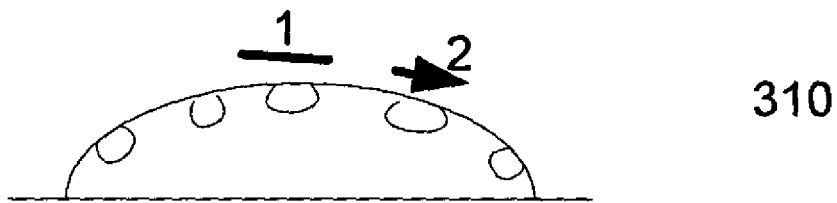
310
FIG. 3c 314
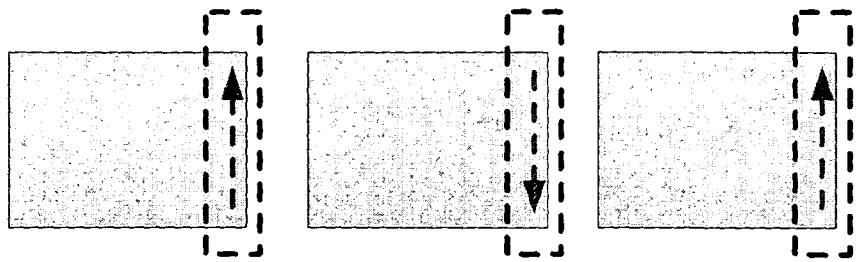
316
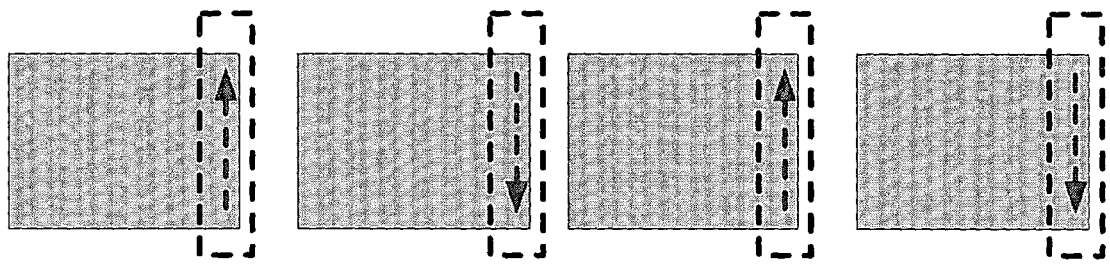
FIG. 3e 318
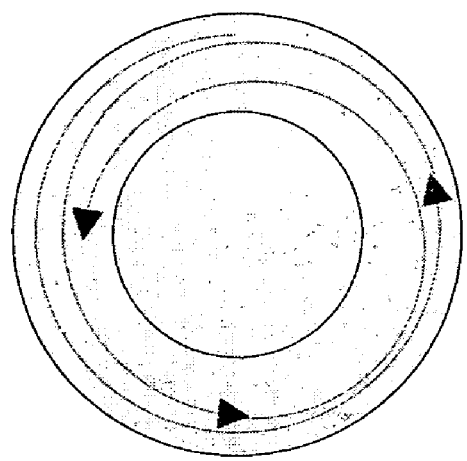
319
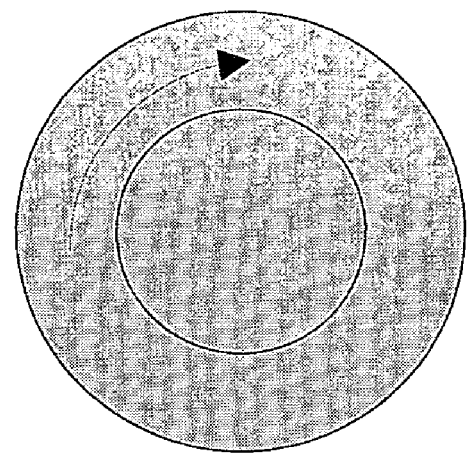
320
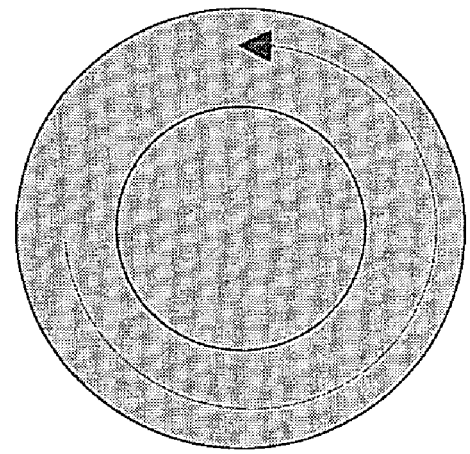
FIG. 3f

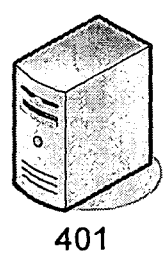 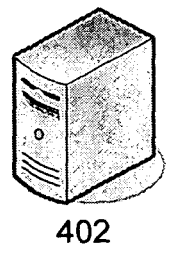 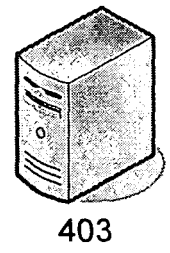
401  402  403
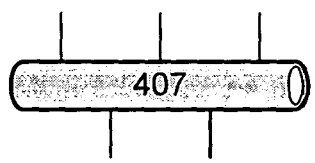
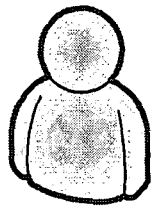 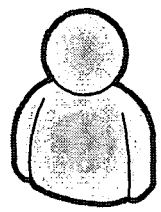 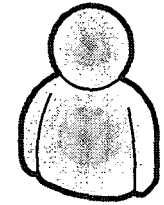
404  405  406
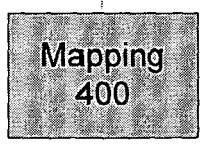 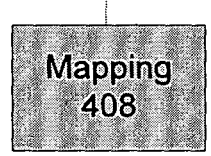 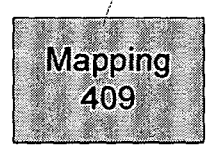 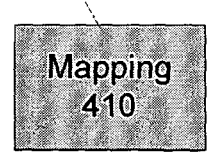
FIG. 4c

| Alphanumeric Character | A | B | C | D | E | F |
|---|---|---|---|---|---|---|
| Increments | 3 | 6 | 5 | 10 | 7 | 8 |

FIG. 5a

| Alphanumeric Character | A | B | C | D | E | F |
|---|---|---|---|---|---|---|
| Movement | 4 up | 3 down | 13 up | 10 up | 7 up | 15 down |

FIG. 5b

| Alphabet Character | A | C | F | G | T | Y |
|---|---|---|---|---|---|---|
| Numeric Character | 1 | 9 | 3 | 4 | 7 | 3 |
| Increment | 3 | 7 | 2 | 15 | 8 | 6 |

FIG. 5c

| Alphabet Character | A | B | C |
|---|---|---|---|
| Mouse Input Stream | 3 Up, 4 Down, 2 Up | 3 Up, 4 Down, 3 Down | 2 Down, 1 Up, 2 Down |
| Numberic Character | 1 | 2 | 3 |
| Mouse Input Stream | 1 Up, 3 Down, 2 Up | 1 Up, 1 Down, 1 Up | 1 Down, 5 Up, 4 Down |

FIG. 5d

| Alphanumeric Character | A | B |
|---|---|---|
| Circular Movement (in degrees) | 30 counterclockwise | 180 clockwise |
| Alphanumeric Character | 1 | 2 |
| Circular Movement (in degrees) | 270 clockise | 360 counterclockwise |

FIG. 5e

METHOD AND SYSTEM FOR SECURE INPUT

BACKGROUND

Online security is becoming a growing concern as more personal information is placed over the internet or in a data format on a personal computer. While much of this data is typically password-protected, current technology allows hackers to spy and extract information, such as passwords, personal identification numbers (PINs), or credit card numbers. Currently passwords are input via a keyboard or through a biometric password manager/fingerprint reader. The disadvantages are that there are several known methods to steal sensitive information from a keyboard input. Hackers use hardware and software key loggers. Also persons sitting next to a user can watch the user entering a password or video cameras could also be hidden to capture users typing their passwords. This problem is even more relevant for blind users who may not be aware of other persons observing their movements. The disadvantage of a fingerprint reader is that they are not common devices, and even if they were ubiquitous a user would have to register his fingerprint and passwords on each device. A method and system is needed to protect users from having passwords or other sensitive data stolen.

BRIEF DESCRIPTION OF THE DRAWINGS

FIG. 3a provides an example login/input device that could be displayed to a user in order to trigger use of the password input in the preferred embodiment.

FIGS. 3b to 3f are example methods of grouping scrolling movements to be input and translated by the preferred embodiment.

FIGS. 4a to 4c are example ways that mapping files can be used in the preferred embodiment.

FIGS. 5a to 5e provide example mapping files to translate groupings of increments/sets of signals into symbols for password input.

DETAILED DESCRIPTION

Figure 1:
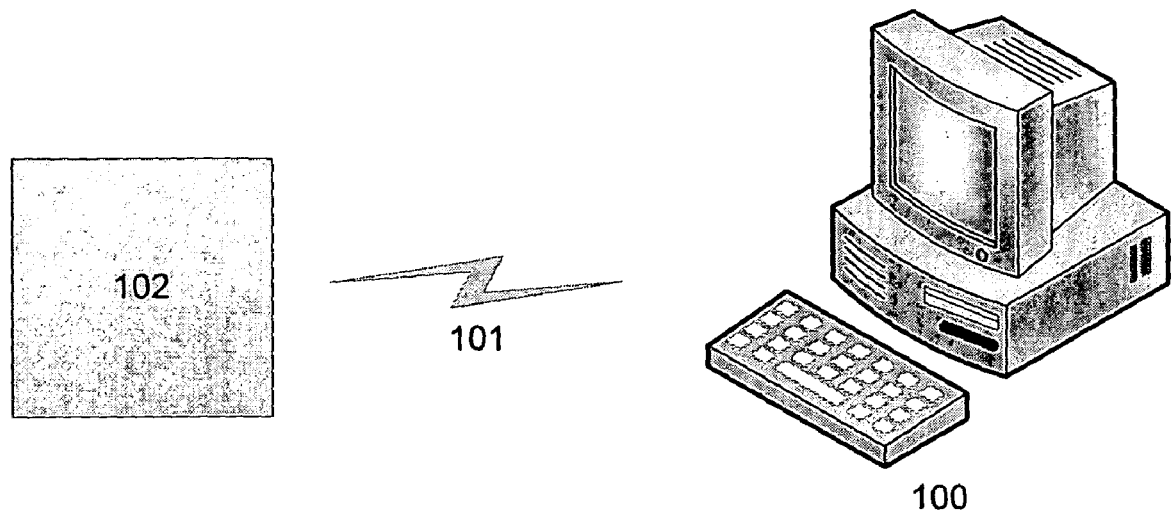
FIG. 1 depicts a system capable of using a preferred embodiment.

To avoid the dangers of malicious hackers stealing passwords or other sensitive information and to avoid the inconvenience of fingerprint readers, the present invention provides a system that could bypass loggers and make it more difficult for cameras to view the actions of a user when entering information. The preferred embodiment uses common inputs, such as a mouse wheel, to input signals that would be translated into characters used in a password. The advantage of this input method is that loggers are not able to track the input, and even if they could log the mouse events it would be difficult for a hacker to put the mouse movements in the right context to recognize that a password is being input. A further layer of obfuscation may be added by creating mappings to translate the scrolling into characters, making it even more difficult for hackers to steal the password string. It would also be difficult to decipher the movements by persons sitting next to a user or by a camera. Input for blind users would be easier, and unlike fingerprint readers, there are multiple devices usable in different embodiments to enter a password, and input devices like computer mice with a wheel are already ubiquitous.

In a preferred embodiment, the mouse wheel of a computer mouse is used to input sensitive information, such as a password, PIN number, any input needed to bypass a security mechanism, or any account numbers (e.g. credit card, bank number, social security number, e-commerce accounts, etc.), etc. These movements are measured in increments (constituting incremental values) as the mouse wheel's increments are detectable by touch because each increment is a separate click on the wheel. These increments are individual signals sent by the mouse, and these grouping of signals/increments (hereinafter referred to as "groupings" or a "set of signals") are grouped together using various triggers and translated into symbols. These symbols and/or characters are then appended together to form a password. For example, signals from the increments on a mouse wheel are grouped when triggered by a change in the direction of movement. Thus, as an example, four increments forward (e.g. up) on the mouse wheel followed by two increments backwards (e.g. down) and then three forward again can be grouped as the incremental values "4," "2," and "3." This is because the trigger for the embodiment to group the first four increments was the change in direction from forward to backward. These values can then be translated into other symbols. For example, a mapping file of the preferred embodiment may translate the '4' increments into the letter 'A', the number '8 ' or possibly even the symbol '+' if the system were able to accept non-alphanumeric characters in the password. Other more complex variations can also be used with the same system as will be explained below. While the examples provided use passwords as the input string, one can appreciate that this system can be adapted for input of many different kinds of sensitive data.

FIG. 1 depicts a system capable of utilizing a preferred embodiment of the present invention. A computing unit 100 is connected to an input device 102 through a communication medium 101. The computing unit 100 consists of anything that can process inputs from a user, such as a computer. The input device 102 is typically handheld, such as a mouse, but could be any peripheral device, particularly those with scrolling capability, such as a touchpad. The preferred embodiment utilizes a mouse because the mouse's wheel is capable of scrolling. Mouse wheels often have increments that are easily detectable by touch. Touchpads do not have detectable increments and thus embodiments would be more complex in order to recognize increments. Many mice now also have a tilt wheel capable of scrolling horizontally. Scrolling can be vertical as well as horizontal; however, any type of bi-directional scrolling movement would be usable with the preferred embodiment, such as the general movement of a mouse. The communication medium 101 could be a wireless signal, a wire, USB connection, etc.

Figure 2A:
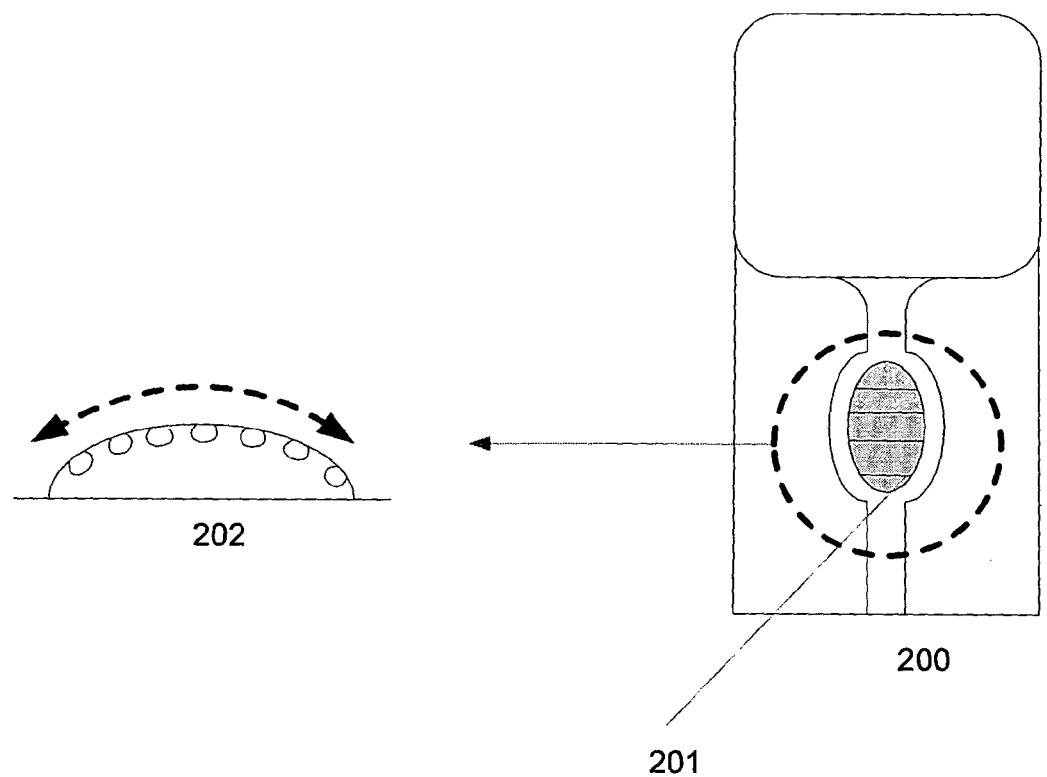
FIGS. 2a to 2c provide examples of input devices that are capable of sending signals that are usable by the preferred embodiment.
Figure 2B:
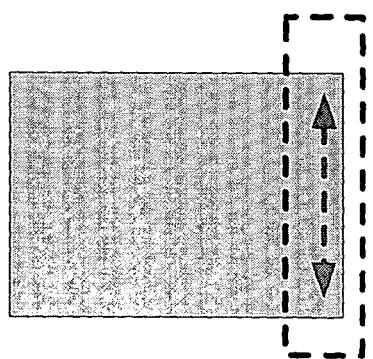
Figure 2C:
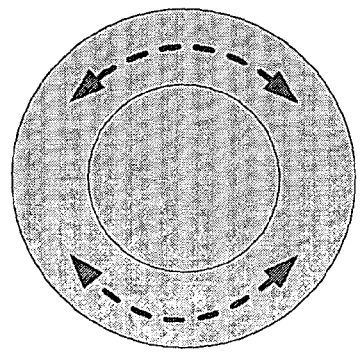

FIGS. 2a to 2c depict three types of input devices 102 that have scrolling capability. In FIG. 2a, a mouse 200 has a scroll wheel 201 which can be moved in a forward/up or backward/down motion which when viewed horizontally 202 is left and right, respectively. Scrolling is typically a bidirectional movement, thus scrolling can also be accomplished by touchpads as shown in FIGS. 2b to 2c. FIG. 2b depicts a rectangular touchpad where the scrolling occurs on the right hand side of the pad. The scrolling movement of the rectangular touchpad is similar to that of the mouse wheel, where forward and backward scrolls up and down, respectively. FIG. 2c depicts a circular touchpad where scrolling is performed on the outer rim of the circle while the inner circle is used for cursor activities. Scrolling up and down can occur by moving the finger on the pad in a counterclockwise and clockwise direction. While these are some of the common inputs for scrolling, one skilled in the art would also be able to adjust the setting such that scrolling forward and backward could be done in other directions, such as horizontally. For example, circular touchpads can also be set so that counterclockwise and clockwise scroll horizontally left and right. Rectangular touchpads can be adjusted so that scrolling forward and backward appears as a horizontal left and right motion, respectively, on the screen. The preferred embodiment would be usable with any of these scrolling inputs which provide bidirectional movement.

In order to determine how to translate signals from mouse input to a password, the preferred embodiment uses signals from the mouse and groups them together. For example, in a typical mouse wheel, a user is able to feel the clicks under his finger as he moves the wheel forwards and backwards. Scrolling movement can thus be measured by these detectable increments of clicks on the mouse wheel. The group of increments, or a grouping, can be grouped as a single set of signals to be translated by the embodiment. For example, four increments forward can be grouped together as a single set of signals with an incremental value of four. The preferred embodiment could translate this incremental value as a symbol, such as an alphanumeric character.

A distinguishing characteristic between the various input devices is that some of the input devices have detectable increments during the scrolling movement, such as the mouse wheel, while others do not, such as the scrolling in a touchpad. In input devices that cannot provide incremental feedback to a user, it may be possible to use other means to measure incremental values, such as a change in direction, to indicate an increment. Thus, a movement forward followed by a movement backward would be measured as two increments, with an incremental value of two, regardless of the distance moved during the forward or backward movement.

FIG. 3a depicts a typical login/password box which could be displayed by the preferred embodiment. Normally, a user would use the keyboard to type in the password in the password box 301 (where the password is typically encrypted and displayed to the user as "**"). In some embodiments of the present invention, a user may have a button 300** to indicate that input will be from an alternative fashion, such as a mouse. In other embodiments, the default could be to input the password via a mouse. Furthermore, it is possible to not display the password as it is input, particularly for blind users to prevent observers or cameras from discerning the number of symbols that are in the password string.

Figure 3D:
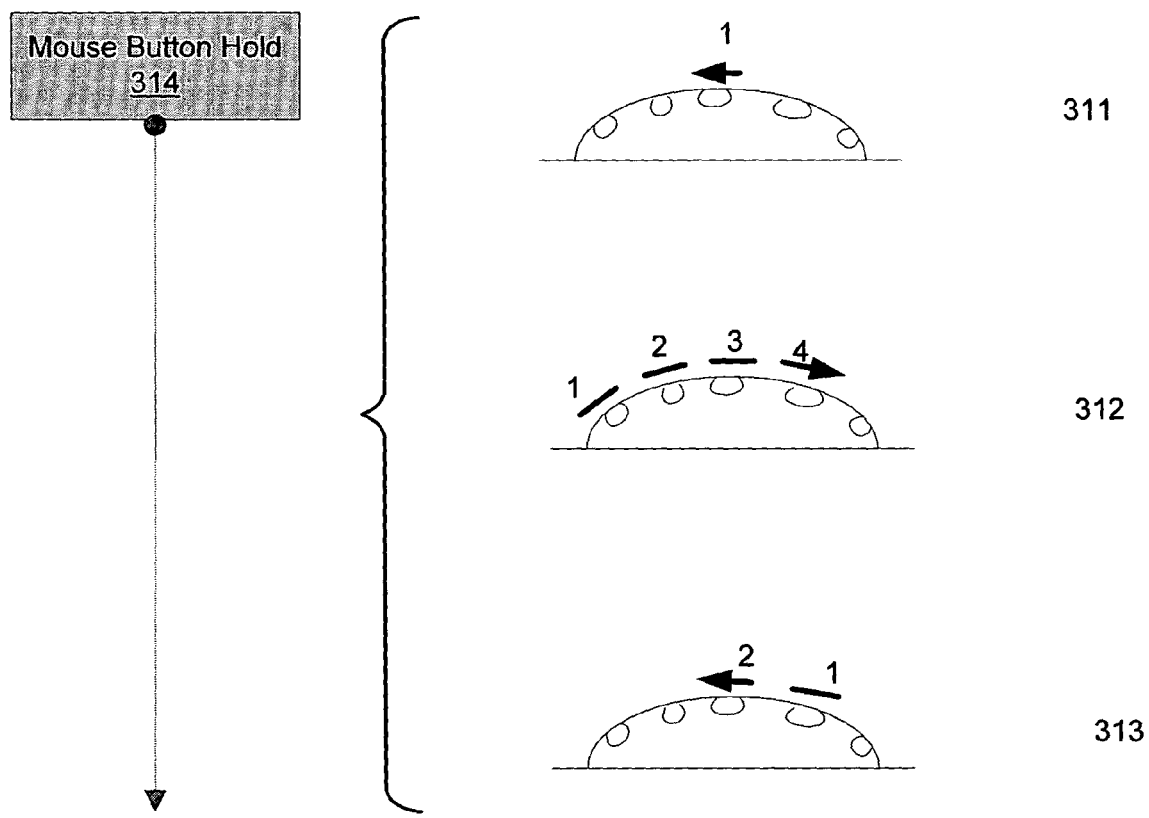

FIGS. 3b to 3f depict how the user would physically enter the password and various methods of grouping sets of signals from the different scrolling movements and increments. In FIG. 3b, increments are grouped as a set of signals by the change in direction. Thus, an increment forward 302, followed by four increments backward 303, two increments forward 304, and three increments backward 305 would result in a grouping of the incremental values one, four, two, and three. The equivalent mouse signal stream would be as follows:

<Up><Down><Down><Down><Down><Up><Up><Down><Down><Down>

This could be translated as the password "1423"; however, as will be explained later, the "1423" could be translated into other symbols.

An advantage of this embodiment is that whereas a keyboard logger would be able to read the keyboard input stream: <1><4><2><3>, a mouse logger would receive the mouse input stream and not be able to discern that it is a password input. Furthermore, a camera watching the keyboard would not be able to discern the amount of increments because the incremental clicks are difficult to gauge by visual feedback.

FIG. 3c depicts an alternative grouping method. A user scrolls the mouse wheel one increment forward (up) 306 and then triggers the end of the grouping using a mouse button click 307. The trigger or "interrupt" separates the increments and allows the embodiment to group the increments. The user then scrolls forward four increments 308 followed by another interrupt by a mouse button click 309. The user then completes the example password by scrolling backward (or, alternatively, forward again) two increments 310. The mouse signal stream would be as follows:

<Up><interrupt><Up><Up><Up><Up><interrupt><Down><Down>

This creates the groupings "142". An extra advantage of this embodiment is that because the button is involved, the translation mapping can be more complex because the mouse stream could also provide the system with groupings mapped based on their direction, such that the system could read the stream as "1 Up, 4 Up, 2 Down" and have "Up" increment values translate differently than "Down" increment values, as will be explained further in the translation section below. For example, "up" could translate to numbers, while "down" translates to letters (or vice-versa), and therefore the stream above could translate to "14B".

Another alternative embodiment is to trigger groupings based on increments that are made while a button is pressed down. In FIG. 3d, a user could depress a mouse button 314, and all the movements that are made can be collected as subgroups. For example, while holding a button down 314, a user could increment forward once 311, backward four times 312, and forward twice 313. The change in directions would be placed in subgroups and all the increments made while the mouse button was down 314 would be translated as one symbol or character. Thus one symbol or character will be mapped to the mouse input stream of "1 Up, 4 Down, 2 Up." One skilled in the art can appreciate the complexity of the groupings that could be created under this embodiment.

FIG. 3e depicts one of the groupings that could be created for input devices that cannot detect increments, such as a mouse wheel without increments, a tilt wheel, a touchpad, etc. As explained earlier, increments would be indicated by changes in direction. The grouping would thus have to be triggered by an interrupt, such as a mouse button click. Due to this hardware limitation, increment groupings created using an input device without detectable increments would be slightly less complex than those input by a mouse wheel having increments. In the example displayed in FIG. 3e, a user would move his finger back and forth three times to indicate three increments 314 followed by a mouse button click 315 to trigger the embodiment to group the first three increments as the value "3." The user would then move his finger back and fourth four times 316 to indicate four increments and follow this with a mouse button click 317. The incremental values would be "34" which could then be translated as other characters.

FIG. 3f depicts an example of the embodiment where the input device is a circular touchpad. Like the rectangular touchpad in FIG. 3e, the circular touchpad also cannot detect increments and could also be used to measure increments by the different techniques already explained, such as using button interrupts between scrolling or holding the button down while scrolling. The circular touchpad could also input scrolling movements measured by the degrees and direction around a circle. For example, a user could scroll two and one-fourths revolution counter-clockwise 318 or equivalently 810 degrees counter-clockwise around the circle 318 to represent a single grouping. The user could then scroll a quarter-circle revolution clockwise 319 or equivalently 90 degrees clockwise around the circle 319. The user then scrolls three-fourths revolution counter-clockwise 320 or equivalently 270 degrees counter-clockwise around the circle 320. This input could then be mapped to different symbols.

In FIG. 3f, the user would not necessarily have to start each scroll from the end of the last scroll. For example, when the user changes direction between scrolls 318 and 319 the user starts where he had originally stopped. However, the user can, as shown between scrolls 319 and 320, pick up his finger and start from anywhere else in the circular touchpad. An advantage to this method is that even if a camera is watching the keyboard, the user can change starting positions each time he inputs the same password, making it harder to detect the movements.

Figure 4A:
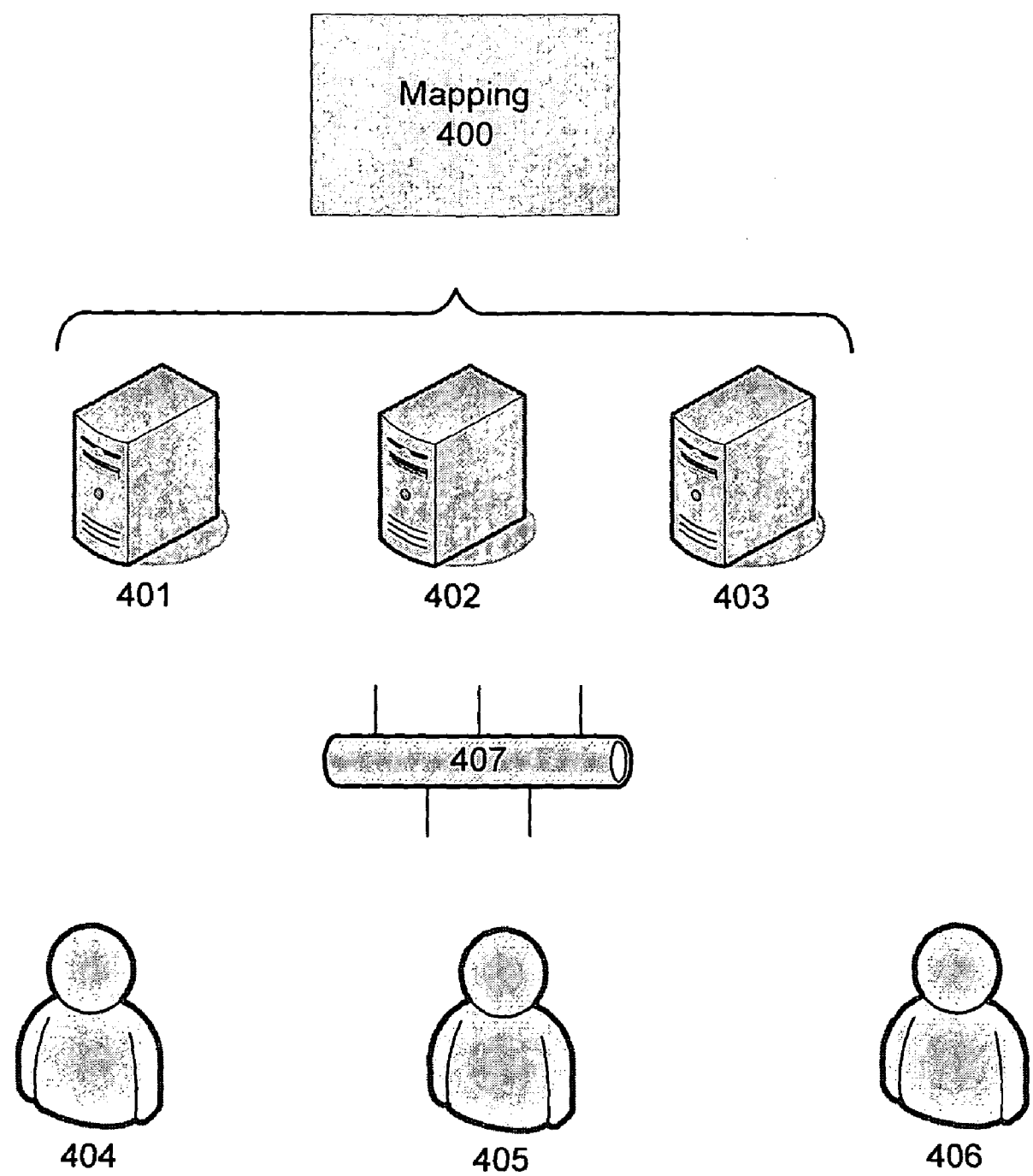
Figure 4B:
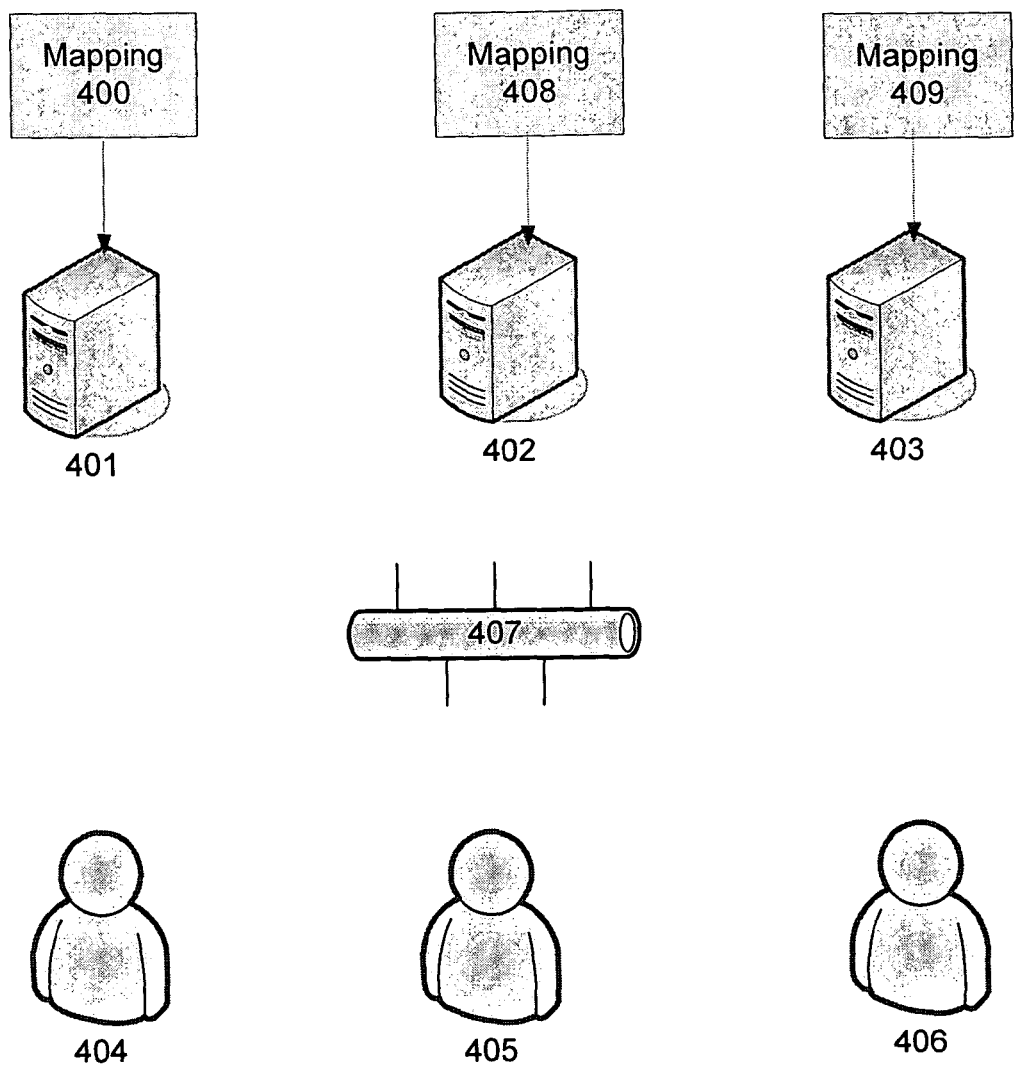

FIGS. 4a to 4c depict several ways the preferred embodiment can translate the groupings into symbols. A mapping is a way of associating at least one input to at least one output. Thus, the sets of signals that were input could be translated to different symbols using a mapping. In FIG. 4a, a set of signals could already be pre-set such that all systems (represented by servers 401, 402, and 403) have the same universal mapping 400 between sets of signals and characters. For example, a server 401 could have the default mapping of one increment translated as the letter 'A', two increments as the letter 'B', three as the letter 'C', and so on. Another server 402 could have the same mapping. An advantage of this system is that users 404, 405, 406 would only have to remember one type of mapping to be used in all systems when accessed over a network 407.

Alternatively, in FIG. 4b, it is also possible to have the mappings set on the server side so that a user inputting a password will have to know the mappings of each server they are accessing over the network 407. For example, each server 401, 402, 403 represents a different website where users enter using a login/password. Users 404 and 405 use the same first mapping 400 to enter the first server 401. Users 404 and 405 would use the same second mapping 408 to enter a second server 402; however, the first 400 and second 408 mappings are different. Since these systems are accessible over a network 407, a third user 406 would be able to register and use the same mappings as the first two users. An advantage of this system is that it would be more complex for a mouse logger to decipher or for a camera watching the movements to determine the password without knowing the associated server and its mapping table.

Alternatively, in FIG. 4c, it is possible to have the mappings established on the client side by the user. Thus, a user 404 could create one mapping file 400 which could be used with any server 401, 402, 403 because the embodiment would translate the groupings from the mapping 400 into character symbols before submitting the encrypted password string over the network 407. A second user 405 could also have his own mapping file 408 to be used on any server 401, 402, 402 accessible over a network 407. An advantage to this method is that a user would only have to remember one type of mapping, but a logger or camera would still need the mapping file because each mapping by a user would be different. For example, if a first user 404 inputted four increments forward as one grouping, in his mapping system that could translate to the letter 'A', but in the mapping system of a second user 405, the same grouping could be translated as the number '5'.

Alternatively, it could be possible to let the user choose from multiple mapping files. Thus, a user 406 could use a first mapping file 409 on a first server 401 accessed over a network 407, and use a second mapping file 410 to access a second server 402. In another separate instance the user 406 could choose to log in using the second mapping file 410 to access the first server 401. The advantage of this method is that the added complexity would make it extremely complex to decipher from a camera or a mouse logger because deciphering would require knowledge of the movements and the correct mapping file to translate and recognize the movements.

FIGS. 5a to 5d provide examples of some of the mappings that could located on a server or created by a user. In FIG. 5a the mapping file translates groupings to character symbols. In FIG. 5b the mapping adds complexity by translating groupings by number as well as direction in order to determine the character. This is an example of a mapping that would likely use mouse interrupts or holding down the mouse button in order to group increments. In FIG. 5c the mapping file translates groupings into either numbers or letters depending on the direction. For example, the increment '3' could be either the number '1' if the scroll was forwards or the letter 'A' if the scroll was backwards. The mapping could also be adapted so that the increment '3' could be the number '1' if the scroll was backwards or the letter 'A' if the scroll was forwards. FIG. 5d provides an example mapping that could be used for groupings made while holding down a mouse button. For example, if a user pressed a mouse button and moved the mouse wheel three forward, four backward, two forward and then let go of the mouse button, the grouping would be translated to the letter 'A'. FIG. 5e provides an example mapping that could be used with groupings created using the circular touchpad.

In these various mappings the groupings are translated into alphanumeric characters, however, the symbols could be any character which the password system may require. As passwords are input by keyboard currently, passwords accepted by systems are typically only alphanumeric characters. However, an advantage of the preferred embodiment is that a system or user could create a mapping between a set of signals and a more complex symbol. For example, three increments forward could translate to the character "§." One could have a password mixed between alphanumeric characters and symbols, for example, a password could be "@$14ab§2£".

Figure 6:
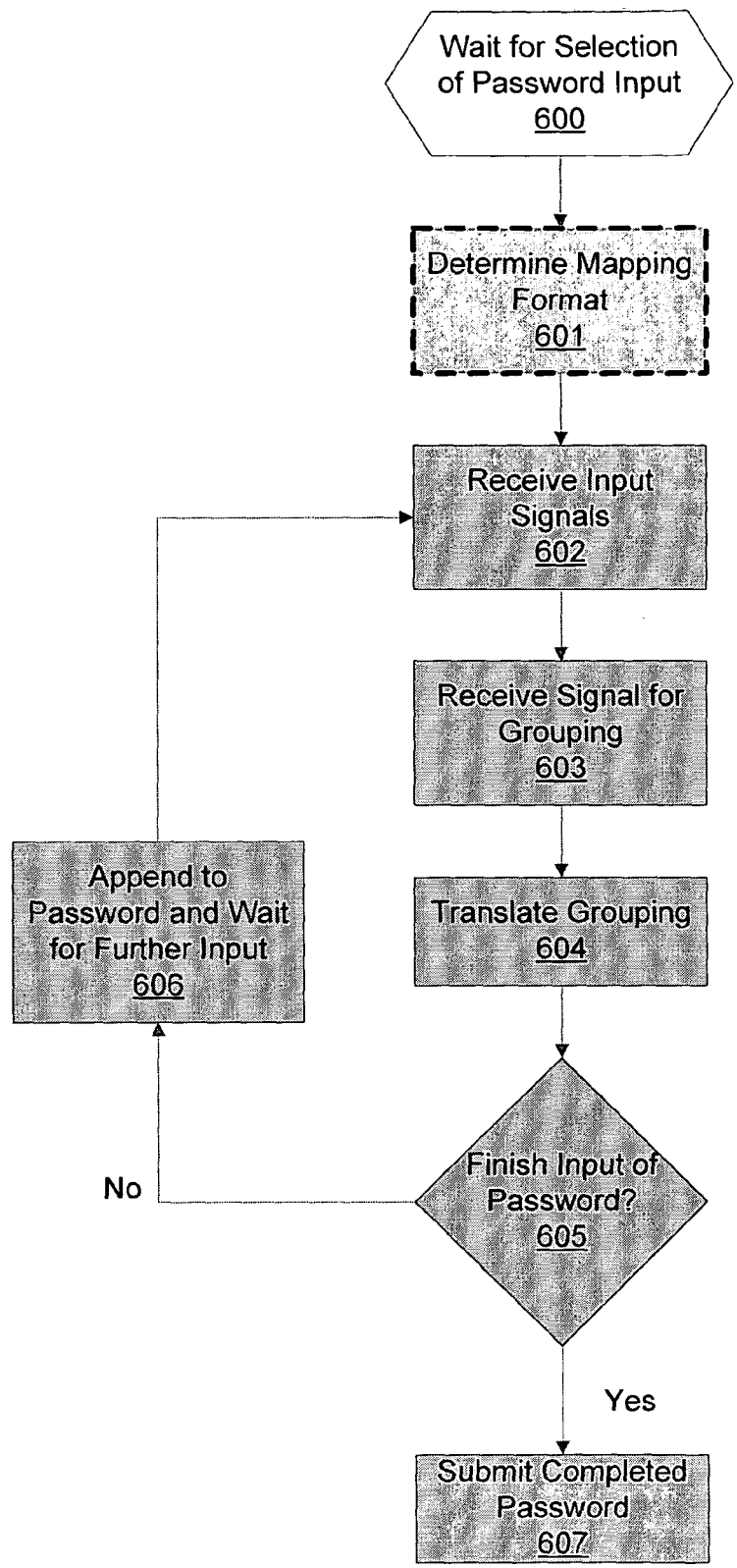
FIG. 6 depicts the logic and steps performed by a preferred embodiment to receive an input, translate the groupings, and submit as a password.

FIG. 6 provides the logic and steps performed by a system of the preferred embodiment. The preferred embodiment would wait for the selection of the password input 600. As explained earlier, the default may be to enter the password using a mouse wheel or other input device, but some embodiments may have the keyboard input as a default and require a user to initialize input using another device. A next possible step may be for the system to determine the mapping 601. This is an optional step because the mapping could already be a pre-determined universal mapping. On the other hand, the server may be reading the mapping from a file created specifically for that server or the embodiment may accept a mapping file created by the user. The embodiment can then receive the input signals from the user 602. When the user has input the increments the system will recognize a trigger that groups the increments 603, the trigger being a change in direction, an interrupt of some kind, a lifting of the mouse button, etc. The system will then translate the grouping 604 into the appropriate symbol using the mapping format. A user can then either enter more increment groupings to append to the password 606 or indicate that he has completed his password entry 605. Embodiments can vary on when the translation step will occur. Translation of the groupings 604 could occur on-the-fly as shown in FIG. 6 or at the completion of the password entry. This may depend on if the mapping file exists on the server side or the client/user side.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:
receiving an input signal from an input device, the input device detecting movement in at least two dimensions;
selecting, at a client device, a mapping operative to uniquely associate a direction and an amount of movement to each character symbol;
responsive to a request at the client device for user entry of a character symbol code:
  detecting movement in a first direction from the input signal of the input device;
  reselecting a first character symbol from the mapping as an amount of detected movement in the first direction changes;
  upon detecting movement in a second direction from the input signal of the input device, submitting a most recently selected first character symbol as a first character in the user entered character symbol code and initially selecting a second character symbol different from the first character symbol from the mapping;
  reselecting the second character symbol from the mapping as an amount of detected movement in the second direction changes; and
  upon detecting movement in a third direction from the input signal of the input device, submitting a most recently selected second character symbol as a second character in the user entered character symbol code.

2. The method of claim 1, wherein the first direction is the same direction as the third direction.

3. The method of claim 1, wherein the mapping is a universal predetermined mapping.

4. The method of claim 1, wherein the mapping is read from a file located on the client device.

5. The method of claim 1, wherein the mapping is read from a file is located on a server.

6. The method of claim 1, wherein the character symbol represents an alphanumeric character.

7. The method of claim 1, wherein the character symbol code is a password.

8. The method of claim 1, wherein the first direction is opposite to the second direction.

9. The method of claim 1, wherein the first direction is perpendicular to the second direction.

10. The method of claim 1, wherein the input device is a touchpad.

11. The method of claim 1, wherein the input device is a mouse with a scrolling device.

12. The method of claim 1, wherein the second character symbol selected upon detecting movement in the second direction is a second most recently selected first character symbol.

13. A method comprising:
receiving an input signal from an input device, the input device detecting movement in at least two dimensions;
selecting, at a client device, a mapping operative to uniquely associate a direction and an amount of movement to a character symbol;
responsive to a request at the client device for user entry of a character symbol code:
  detecting movement in a plurality of directions from the input signal of the input device;
  for each of the plurality of directions, calculating an amount of movement in the respective direction;
  as the calculated movement amount in each direction changes, adjusting a selected character symbol for the respective direction retrieved from the mapping;
  upon detecting a change of movement direction from a first direction to a second direction, classifying a most recently selected character symbol for the first direction as a final character symbol for the first direction and adjusting the selected character symbol in the second direction to be different from the selected character symbol in the first direction; and
  submitting the final character symbols for each direction as the user entered character symbol code.

14. A system, comprising:
a client device executing an application requesting user entry of a character symbol code;
a input device detecting movement in at least two dimensions and providing an input signal to the client device; and
a processor in the client device, the processor configured to:
  detect movement in a plurality of directions from the input signal of the input device;
  for each of the plurality of directions, calculate an amount of movement in the respective direction;
  as the calculated movement amount in each direction changes, adjust a selected character symbol for the respective direction retrieved from the mapping;
  upon detecting a change of movement direction from a first direction to a second direction, classify a most recently selected character symbol for the first direction as a final character symbol for the first direction and adjust the selected character symbol in the second direction to be different from the selected character symbol in the first direction; and
  submit the final character symbols for each direction as the user entered character symbol code.

* * * * *